US006202406B1

(12) United States Patent
Griffin et al.

(10) Patent No.: US 6,202,406 B1
(45) Date of Patent: Mar. 20, 2001

(54) METHOD AND APPARATUS FOR CATALYST TEMPERATURE CONTROL

(75) Inventors: Joseph R. Griffin, Fenton; Hamid B. Servati, Farmington Hills, both of MI (US)

(73) Assignee: Heralus Electro-Nite International N.V., Houthalen (BE)

( * ) Notice: Subject to any disclaimer, the term of this patent is extended or adjusted under 35 U.S.C. 154(b) by 0 days.

(21) Appl. No.: 09/272,220

(22) Filed: Mar. 18, 1999

Related U.S. Application Data
(60) Provisional application No. 60/079,880, filed on Mar. 30, 1998, and provisional application No. 60/104,493, filed on Oct. 16, 1998.

(51) Int. Cl.$^7$ ...................................... F01N 3/00

(52) U.S. Cl. ................... 60/274; 60/285; 60/286

(58) Field of Search ............... 60/274, 276, 277, 60/284, 285, 286, 303

(56) References Cited

U.S. PATENT DOCUMENTS

| | | |
|---|---|---|
| 5,115,780 | 5/1992 | Jönsson et al. . |
| 5,201,173 | 4/1993 | Fujimoto et al. . |
| 5,277,025 * | 1/1994 | Gonze et al. ........................... 60/274 |
| 5,307,626 | 5/1994 | Maus et al. . |
| 5,319,929 * | 6/1994 | Cornelison et al. .................... 60/274 |
| 5,353,590 * | 10/1994 | Pettit et al. ............................. 60/274 |
| 5,377,486 | 1/1995 | Servati et al. . |
| 5,414,994 | 5/1995 | Cullen et al. . |
| 5,419,122 * | 5/1995 | Tabe et al. .............................. 60/274 |
| 5,444,976 * | 8/1995 | Gonze et al. ........................... 60/274 |

(List continued on next page.)

OTHER PUBLICATIONS

SAE International, *The Development of BMW Catalyst Concepts for LEV/ULEV and EU III/IV Legislations 6 Cylinder Engine with Close Coupled Main Catalyst*, Feb. 23–26, 1998, paper No. 980418.

SAE International, *Second Generation Platinum RTD Exhaust Gas Temperature Sensor for −50° C to 1000° C Measurement*, May 4–6, 1998, paper No. 981419.

SAE International, *Catalytic Converter Diagnosis Using the Catalyst Exotherm*, Oct. 17–20, 1994, paper No. 942058.

SAE International, *The Conical Catalytic Converter and Its Potential for Future Close–Coupled Converter Concepts*, Feb. 23–26, 1998, paper No. 980414.

(List continued on next page.)

Primary Examiner—Teresa Walberg
Assistant Examiner—Fadi H. Dahbour
(74) Attorney, Agent, or Firm—Akin, Gump, Strauss, Hauer & Feld, L.L.P.

(57) ABSTRACT

An apparatus for minimizing the total quantity of hydrocarbon emissions from a catalytic converter in the exhaust path of an internal combustion engine includes a temperature sensor coupled to the catalytic converter for continuously generating an output signal representative of the catalyst temperature, and a controller for receiving the output signal from the temperature sensor and for enhancing the output signal to have a response time of less than one second. The controller adjusts one or more operating parameters of the engine to cause the catalyst temperature to rapidly rise when the catalyst temperature is less than the catalytic converter light-off temperature and adjusts one or more operating parameters of the engine to minimize the rate of hydrocarbon emissions output from the catalytic converter when the catalyst temperature is greater than the catalytic converter light-off temperature.

26 Claims, 11 Drawing Sheets

U.S. PATENT DOCUMENTS

| | | |
|---|---|---|
| 5,537,321 | 7/1996 | Yoshizaki et al. . |
| 5,630,315 | 5/1997 | Theis . |
| 5,706,652 | 1/1998 | Sultan . |
| 5,715,676 | 2/1998 | Schnaibel et al. . |
| 5,752,382 | 5/1998 | Hanafusa et al. . |
| 5,765,370 | 6/1998 | Hanafusa et al. . |
| 5,787,705 * | 8/1998 | Thoreson .................... 60/274 |
| 5,845,485 * | 12/1998 | Murphy et al. ............... 60/274 |
| 5,878,567 * | 3/1999 | Adamczyk, Jr. et al. ...... 60/274 |
| 5,937,637 * | 8/1999 | Fujishita et al. ............. 60/274 |
| 5,953,908 * | 9/1999 | Appleby ...................... 60/286 |
| 5,964,089 * | 10/1999 | Murphy et al. ............... 60/286 |
| 6,041,593 * | 3/2000 | Karlsson et al. .............. 60/284 |

OTHER PUBLICATIONS

SAE International, *Alternative Technologies for Studying Catalyst Behaviour to Meet OBD II Requirements*, Oct. 18–21, 1993, paper No. 93254.

SAE International, *Engine–Out and Tail–Pipe Emission Reduction Technologies of V–6 LEVs*, Feb. 23–26, 1998, paper No. 980674.

SAE International, *OBD–II Performance of Three–Way Catalysts*, Feb 23–26, 1998 paper No. 980665.

SAE International, *Optimization of the Monitored Volume for LEV Catalyst Monitoring*, Hepburn et al., SAE paper No. 982847.

* cited by examiner

METHOD AND APPARATUS FOR CATALYST TEMPERATURE CONTROL

CROSS-REFERENCE TO RELATED APPLICATIONS

This application claims the benefit of U.S. Provisional Application No. 60/079,880 filed Mar. 30, 1998, entitled "ADAPTIVE CLOSED LOOP CATALYST TEMPERATURE CONTROL FOR REDUCTION OF TAILPIPE EMISSIONS AND CATALYST DIAGNOSTIC FUNCTION IN AUTOMOTIVE VEHICLES" and U.S. Provisional Application No. 60/104,493 filed Oct., 16, 1998, entitled "CLOSED LOOP CATALYST TEMPERATURE FEEDBACK FOR CONTROLLED CATALYST LIGHT-OFF AND DIAGNOSTICS FOR ULEV".

BACKGROUND OF THE INVENTION

There are many new technologies being developed and existing technologies being refined to meet ever more stringent automotive exhaust emission standards. The two general areas of development for reducing automotive exhaust emissions are: (1) reducing engine generated exhaust emissions and (2) optimizing after-treatment of engine generated exhaust emissions. Exhaust after-treatment generally involves one or more catalytic converters in the engine exhaust path.

One area where there is significant room for improvement is the reduction of emissions during the cold start period, i.e. the period of time from when the engine is started to when catalyst light-off occurs. During the cold start period, generated exhaust hydrocarbon (HC) emissions are high and the performance of the exhaust after-treatment system is low. The cold start period lasts approximately 30–60 seconds with current (OEM) emission control strategies and accounts for up to 80% of the total measured tail pipe HC exhaust emissions under the federal test procedure FTP75 used for evaluating the emission of automotive engine systems.

There are three primary engine operating parameters that are generally controlled for optimizing engine performance; air, fuel, i.e. air-fuel (A/F) ratio, and ignition timing. Similarly, there are three primary engine operating parameters that need to be controlled for optimizing the conversion efficiency of a three-way catalyst; air, fuel, i.e. A/F ratio, and catalyst energy (temperature). Any emission control strategy involving control of engine A/F ratio, and ignition must be performed within the limits of satisfactory driveablilty, thus limiting the range of control options.

Automotive tail pipe emissions are conventionally minimized by closed loop control of engine air and fuel by way of feedback from an oxygen sensor mounted in the engine exhaust path. The oxygen sensor measures the excess oxygen in the engine exhaust gas and the resulting sensor output signal is used to correct the engine fuel injection period for each cylinder event. Based on the engine A/F ratio (computed from the oxygen sensor output signal) the exhaust gas concentrations (directly oxygen and empirically HC, CO, NOx) that enter the catalyst from the engine exhaust are computed. There are additionally, limited computer models that predict catalyst energy (temperature) as a function of A/F ratio and exhaust gas temperature. Thus, when the oxygen sensor is active, overall optimization of the emission control process may be performed.

However, emission control based primarily upon sensing excess oxygen in the engine exhaust has limitations. First, there is no feedback from the oxygen sensor during the cold start period since the oxygen sensor is not yet active. Second, there are, currently, no robust exhaust gas temperature models for cold catalyst operation. Available catalyst energy models are limited to hot, stabilized, steady state conditions and an assumed catalyst aging condition. Thus, emission control is effectively open loop and based on many improper assumptions under cold start conditions. Further, lacking any direct measurement of catalyst energy, overall emission control is sub-optimum since catalyst energy models are accurate only under very limited conditions.

It is well understood that total hydrocarbon emissions are reduced with more rapid catalyst light-off. However, increasing catalyst heating by adjusting A/F ratio, ignition timing etc. generally results in higher exhaust emission rates. Stoichiometric A/F ratio control is more optimum for minimizing exhaust emission rate and is not optimum for maximum catalyst heating. Minimizing total emissions requires shifting control strategies from maximum catalyst heating to stoichiometric control when catalyst light-off occurs.

Directly measuring catalyst temperature and using the catalyst temperature as an additional engine control variable allows one to safely adjust the engine operating parameters to achieve a more aggressive catalyst heating function during the cold start period than is possible under a strictly open loop emission control strategy. Experimental data shows that the total tailpipe emissions can be reduced using a strategy of maximum heating of the catalyst during the cold start period compared to strictly minimizing the rate of generated engine exhaust gas HC emissions.

In addition to minimizing undesired exhaust emissions, more modem automotive emission control systems are required to monitor tailpipe HC emissions and to actuate a malfunction indicator in the vehicle if a threshold value of undesired emissions is exceeded. More modem emission control systems are also required to isolate the cause of excessive emissions to a malfunctioning component.

The dominant cause of increased tail pipe emissions at low emission vehicle (LEV) and ultra low emission vehicle (ULEV) levels is degraded catalyst light-off performance. A current approach for diagnosing catalytic converter performance is the use of pre-catalyst and post-catalyst oxygen sensors to determine the warmed up oxygen storage capacity of the catalytic converter. However, the measurement of oxygen storage capacity does not provide reliable information regarding the critical light-off performance of the catalyst. Other approaches have sought to measure the exothermic activity in the catalytic converter by monitoring the difference between the catalytic converter inlet and outlet temperatures. These approaches require multiple temperature sensors and require interpretation of small temperature differences under widely varying conditions to discriminate malfunctioning converters from properly functioning converters.

Satisfactorily functioning catalysts exhibit an increase in the rate of temperature rise following catalyst light-off due to a release of exotherm energy from the catalyst. FIG. 1 illustrates a typical catalyst temperature profile during a light-off period. Experiments have indicated that by adjusting engine operating parameters to heat the catalyst at a constant rate during the cold start period, it is possible to determine degraded catalyst HC conversion by measuring the time that it takes for the catalyst to achieve a predetermined target temperature. Constant rate heating of the catalyst is consistent with maximum heating of the catalyst prior to catalyst light-off. The present invention utilizes an Energy Control and Optimization (ECO) strategy of constant rate maximum catalyst heating during the cold start period combined with the use of catalyst temperature as an additional emission control variable to provide for the simultaneous reduction of cumulative tail pipe HC emissions and for the accurate determination of catalyst performance using only a single temperature sensor for measuring the temperature of the catalyst in the catalytic converter.

BRIEF SUMMARY OF THE INVENTION

Briefly stated, the present invention comprises an apparatus for minimizing the total quantity of hydrocarbon emissions from a catalytic converter in the exhaust path of an internal combustion engine, the catalytic converter including a catalyst having a light-off temperature. The apparatus comprises a temperature sensor coupled to the catalytic converter for continuously generating an output signal representative of the catalyst temperature, and a controller for receiving the output signal from the temperature sensor, for enhancing the output signal to have a response time of less than one second, and for adjusting at least one operating parameter of the engine to cause the catalyst temperature to rapidly rise when the catalyst temperature is less than the light-off temperature and adjusting at least one operating parameter of the engine to minimize the rate of hydrocarbon emissions output from the catalytic converter when the catalyst temperature is greater than the light-off temperature.

The present invention further comprises a method of minimizing the total quantity of hydrocarbons emitted from a catalytic converter located in the exhaust path of an internal combustion engine, the catalytic converter including a temperature sensor and a catalyst having a light-off temperature. The method comprises the steps of continuously determining the catalyst temperature based on an output signal from the temperature sensor, adjusting at least one operating parameter of the engine to cause the catalyst temperature to rapidly rise when the catalyst temperature is less than the light-off temperature, and adjusting at least one operating parameter of the engine to achieve substantially stoichiometric conditions in the exhaust of the engine when the catalyst temperature is equal to or greater than the catalyst light-off temperature. The present invention further comprises an apparatus for diagnosing degradation of hydrocarbon conversion efficiency of a catalytic converter including a catalyst by measuring the catalyst temperature during a light-off period. The apparatus comprises a temperature sensor coupled to the catalytic converter for continuously generating a first output signal representative of the catalyst temperature and a controller for receiving the first output signal from the temperature sensor, for enhancing the output signal to have a response time of less than 1 second and for controlled heating of the catalyst during a cold start period whereby the controller generates a second output signal indicative of the catalytic converter hydrocarbon efficiency based on a change in the catalyst temperature during the light-off period.

The present invention further comprises a method of diagnosing degradation of hydrocarbon conversion efficiency of a catalytic converter including a catalyst, located the exhaust path of an internal combustion engine, based on measuring the temperature of the catalyst during a light-off period, the catalytic converter including a temperature sensor and the catalyst having a light-off temperature. The method comprises the steps of adjusting an operating parameter of the engine to cause a controlled heating of the catalyst during the cold start period, continuously determining the temperature of the catalyst based on an output signal from the temperature sensor; computing a rate of change of the catalyst temperature, comparing the rate of change of the catalyst temperature during a first period of time when the catalyst temperature is less than the light-off temperature to the rate of change of the catalyst temperature during a second period of time when the catalyst temperature is greater than or equal to the light-off temperature, and generating an output signal indicative of the catalytic converter having a degraded hydrocarbon conversion efficiency if the rate of change of the catalyst temperature during the second period of time is less than or equal to the rate of change of catalyst temperature during the first period of time by at least a predetermined value.

The present invention further comprises a method of diagnosing degradation of hydrocarbon conversion efficiency of a catalytic converter located in the exhaust path of an internal combustion engine by measuring the temperature of a catalyst in the catalytic converter during a light-off period, the catalyst having a light-off temperature. The method comprises the steps of continuously determining the temperature of the catalytic converter based on an output signal from a temperature sensor coupled to the catalytic converter, adjusting an operating parameter of the engine to cause a controlled heating of the catalyst during a cold start period; measuring the time required period for the catalyst temperature to exceed a predetermined target temperature, and generating an output signal indicative of the catalytic converter having a degraded hydrocarbon conversion efficiency if the time period required for the catalyst temperature to exceed the predetermined target temperature is greater than a predetermined value.

The present invention further comprises a method of simultaneously diagnosing degradation of hydrocarbon conversion efficiency of a catalytic converter in the exhaust path of an internal combustion engine and minimizing total hydrocarbon emissions from the catalytic converter, the catalytic converter including a catalyst having a light-off temperature. The method comprises the steps of: continuously determining the temperature of the catalyst based on a first output signal from a temperature sensor coupled to the catalytic converter, adjusting at least one operating parameter of the engine to cause substantially constant heating of the catalyst when the catalyst temperature is less than the light-off temperature whereby the catalyst temperature rapidly rises, adjusting at least one operating parameter of the engine to achieve substantially stoichiometric conditions in the exhaust of the engine when the catalyst temperature is equal to or greater than the catalyst light-off temperature, measuring the time required for the instantaneous temperature of the catalyst to exceed a predetermined target temperature, and generating a second output signal indicative of degraded hydrocarbon conversion efficiency if the time period required for the catalyst temperature to exceed the predetermined target temperature is greater than a predetermined value.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

The present invention provides a method and apparatus for minimizing the total hydrocarbon emissions from a catalytic converter in the exhaust path of an internal combustion engine by measuring the temperature of the catalyst in the catalytic converter and using the catalyst temperature in combination with known characteristics of the catalyst to modify engine control parameters during a catalyst light-off period of the engine operation. The present invention also provides means for simultaneously diagnosing degradation of hydrocarbon conversion efficiency of the catalyst by computations performed on the catalyst temperature measurements.

Figure 1:
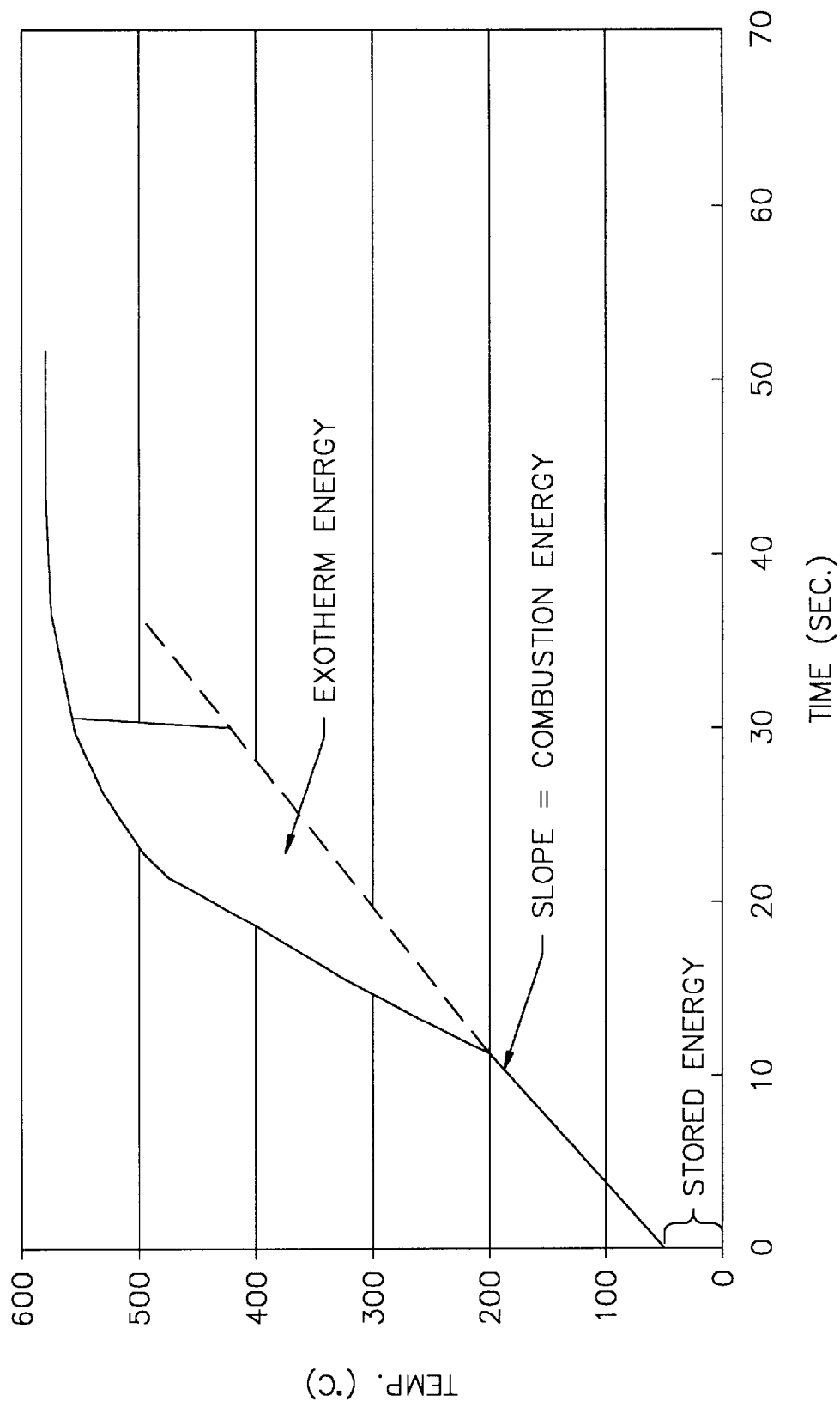
FIG. 1 is a plot of catalyst temperature versus time during a catalyst light-off period.
Figure 2:
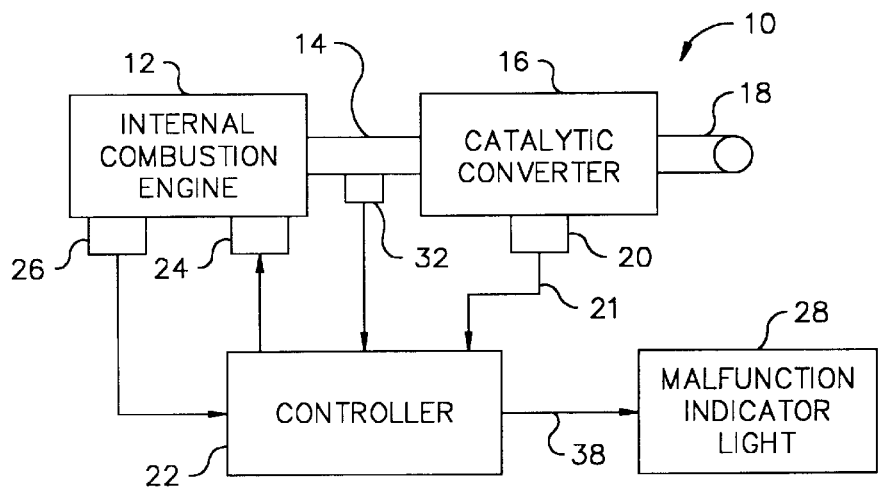
FIG. 2 is a schematic block diagram of a first preferred embodiment of a catalyst temperature control apparatus.

Referring to the drawings in detail wherein like numerals are used to indicate like elements throughout there is shown in FIG. 2, a schematic block diagram of a first preferred embodiment of a catalyst temperature control apparatus 10 for minimizing a total quantity of hydrocarbon (HC) emissions expelled from a catalytic converter 16. The input of the catalytic converter 16 is connected to an internal combustion engine 12 by an exhaust pipe 14. The output of the catalytic converter 16 is connected to a tailpipe 18. The temperature control apparatus 10 also includes emission control components including a controller 22 which accepts signals from engine sensors 26, an oxygen sensor 32, and a temperature sensor 20 for actuating engine controls 24 which control the operation of the engine 12 and for actuating a malfunction indicator light 28 to display a malfunction of an emission control component to a vehicle operator. The internal combustion engine 12, exhaust pipe 14, catalytic converter 16, tailpipe 18 and emission control components are shown as typically relating to automobiles. However, it will be apparent to those of ordinary skill in the art that the present invention is not limited to use with automobiles, but may be used with other types of vehicles and with other types of internal combustion engine driven machines in general.

The catalytic converter 16 includes a catalyst of a type known to those skilled in the art where gas species of $H_2$, HC, CO and $NO_x$ in the exhaust gas applied to the input of the catalytic converter 16 are converted to more desirable gas species (i.e. $CO_2$, $H_2O$ and $N_2$) and are output from the catalytic converter 16 and into the tailpipe 18 as tailpipe gas which is released to the atmosphere. The aforementioned catalytic conversion process is accompanied by an exothermal reaction in the catalyst resulting in an increased catalyst temperature compared to the same catalyst not undergoing the catalytic conversion process. The efficiency in which hydrocarbons are converted to more desirable gas species is called the hydrocarbon conversion efficiency of the catalytic converter 16, as represented by Equation 1:

$$\% \ HC \ \text{Efficiency} = \left(1 - \frac{HC \ \text{present within tailpipe}}{HC \ \text{present within engine exhaust}}\right) \times 100 \quad (1)$$

In the first preferred embodiment of the catalyst temperature control apparatus 10, the catalyst within the catalytic converter 16 is characterized by a light off-temperature, i.e. the temperature at which the conversion of exhaust gas emission components is started. In a typical catalytic converter the light-off temperature of the catalyst is in the region of 150 to 450° C. The light-off temperature of a catalytic converter is distinctive to each type of catalytic converter, and for a particular catalytic converter is generally a function of the air-fuel (A/F) ratio of the engine exhaust gas which is input to the catalytic converter. Models of catalytic converter catalysts relating the A/F ratio to catalyst light-off temperature are well known in the art and need not be described for a full understanding of the present invention.

In the first preferred embodiment of the catalyst temperature control apparatus 10, there is a single temperature sensor 20 which is engaged with or is coupled to the catalytic converter 16 for sensing the temperature of the catalyst and continuously generating an electrical output signal 21 which is proportional to or representative of the instantaneous catalyst temperature. In the first preferred embodiment, the temperature sensor 20 is a Heraeus Sensor-Nite Model Number TS200 EGTS platinum resistive temperature detector (RTD) sensor, which provides for a substantially linear change in resistance over a sensed temperature range of from 0 to 1,000° C. In the preferred embodiment, the temperature sensor is installed about 1 inch downstream from the front face and generally in the center of the catalyst. As will be appreciated by those skilled in the art, the temperature sensor 20 could be placed at another location in the catalyst and other types of temperature sensors from other manufacturers having suitable accuracy, stability and reliability could be used as the catalyst temperature sensor 20, within the spirit and scope of the invention.

The first preferred embodiment of the catalyst temperature control apparatus 10 also includes a controller 22 for receiving the temperature output signal 21 from the temperature sensor 20 and for processing the sensor output signal 21 to provide an improved response time which preferably is less than one second. In the preferred embodiment, the temperature sensor 20 has a response time of about 5+/−0.1 seconds to a 300 degree C. step change at a gas velocity of 11 meters per second. The controller 22 enhances the response time of the RTD temperature sensor 20 by applying the sensor output signal 21 to an empirical software model of a small dimension thermocouple (not shown in FIG. 2). The resulting effective response time of the temperature sensor 21 is about one second. As will be apparent to those skilled in the art, the more rapid the rise time of the effective sensor output, the more faithful will be the control of the engine 12. However, the present invention is not limited to an effective sensor rise time of one second. The choice of any effective sensor rise time consistent with satisfactory control dynamics for a particular engine and catalyst is within the spirit and scope of the invention.

Figure 3:
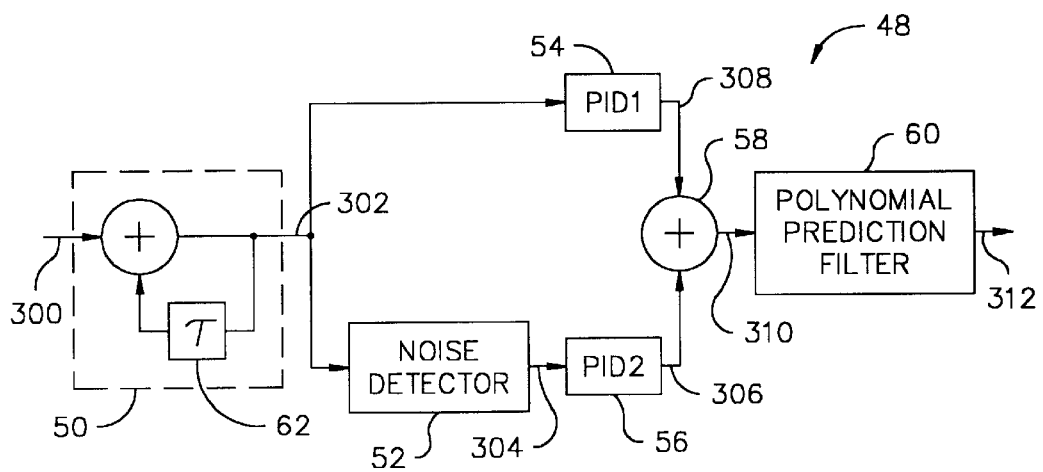
FIG. 3 is a schematic block diagram of a small dimension thermocouple model.

Referring now to FIG. 3, there is shown a functional block diagram of the small dimension thermocouple model 48 as implemented in software in the controller 22. In use, the temperature sensor output signal 21 is first applied to an analog-to-digital converter (not shown) in the controller 22 where the signal 21 is sampled at a rate of about 100 samples per second. The sampled signal 300 is then applied to the small dimension thermocouple model 48 and is first processed in a recursive filter 50 having a unit delay feedback element 62 providing a low pass filter function. The recursive filter output 302 is then applied to both a noise detector 52 and to a first proportional-integral-differential (PID1) controller function 54. The noise detector 52 detects signals which change at rates exceeding the equivalent of 200 degrees C. per second to eliminate non-physical signals due to noise pickup or malfunctions and to thereby prevent such signals from corrupting the output 312 of the small dimension thermocouple model 48. The output 304 from the noise detector 52 is applied to a second proportional-integral-differential (PID2) controller function 56. The output 306 of PID2 56 is added to the output 308 of PID1 57 in a summer 58. PID1 54 and PID2 56 are controller functions well known to those skilled in control theory, providing adjustable phase lead, lag and gain, and are adjusted to provide control stability to the catalyst temperature control apparatus 10 when interoperating with the controls 24 of the engine 12. The output 310 of the summer 58 is applied to a polynomial prediction filter 60. The polynomial prediction filter 60 is modeled on a temperature sensor having a 500 millisecond response to a 300 degree step in temperature. The modeling of sensor responses with polynomial prediction filters is well known to those skilled in the art and need not be described in detail for a full understanding of the present invention.

In the first preferred embodiment the controller 22 also actuates the engine controls 24 to adjust the operating parameters of the engine 12 based on the output 312 of the small dimension thermocouple model 48. When the catalyst temperature is less than the catalyst light-off temperature, the controller 22 adjusts the engine controls 24 to change the operation of the engine 12 in a manner which causes the catalyst temperature to rapidly rise to the catalyst light-off temperature. When the catalyst temperature is greater than the catalyst light-off temperature, the controller 22 adjusts the engine controls 24 to change the operation of the engine 12 in a manner that minimizes the rate of HC emissions from the tail pipe 18. Preferably the controller 22 includes a microprocessor. The microprocessor may be a separate processing element for performing calculations and functions as described herein, or may be a part of an existing engine control unit (not shown). The microprocessor is preferably of a type generally well known and commercially available and incorporates a computer program that executes a defined set of steps. Such microprocessors used in automobiles are well known and further description thereof is not necessary for complete understanding of the present invention. Suffice it to say that the microprocessor is able to accept instructions and data from an associated memory (not shown) and data from various engine sensors 26 including a throttle valve opening sensor, an intake air sensor, an engine rotational speed sensor, a crank shaft position sensor, the oxygen sensor 32 and the temperature sensor 20; perform mathematical calculations; store the resulting data in the associated memory; and perform the control functions associated with adjusting the engine operating parameters by actuating the various engine controls 24 including the engine throttle valve, fuel injection valves, ignition timing, exhaust gas return valve, secondary air pump and bypass air flow valves, for operation of the internal combustion engine 12. It will be understood by those skilled in the art that other engine sensors and engine controls may be used and the controller 22 need not be a microprocessor. Other means for performing the controller 22 function , such as a combination of analog elements and/or digital logic elements, possibly implemented as large scale integrated circuits and executing combinatorial and sequential logic could be used as the controller 22 within the spirit and scope of the invention.

The first preferred embodiment of the catalyst temperature control apparatus 10 may further include a display or indicator 28, known as a "malfunction indicator light" or "MIL", connected by a line 38 to the controller 22, for indicating to an engine operator that the catalyst is functioning below a predetermined threshold operating level. The indicator 28 is preferably a light or LED on the automobile dashboard which, when lit or illuminated, informs the vehicle operator that the catalyst is not functioning efficiently and may need to be replaced. As will be appreciated by those skilled in the art other means may be used to alert the operator, including aural annunciation, within the spirit and scope of the invention.

It is well established that up to 80% of vehicle tailpipe hydrocarbon (HC) gas emissions are emitted during the first few minutes following a cold vehicle start. Conventionally, reduction of tailpipe HC gas emissions during the cold start period, i.e. that period between the time the engine is started and the time the catalytic converter reaches the light-off temperature, has been focused on minimizing the rate of engine HC exhaust emissions, by adjusting the engine air/fuel ratio to be as lean as possible consistent with engine operability. While increasing the air/fuel ratio reduces the engine HC exhaust gas emissions rate, a lean air/fuel ratio requires a relatively advanced ignition timing for acceptable engine operation thereby, reducing the heat output of the engine and increasing the time for the catalytic converter to achieve light-off temperature.

Figure 4:
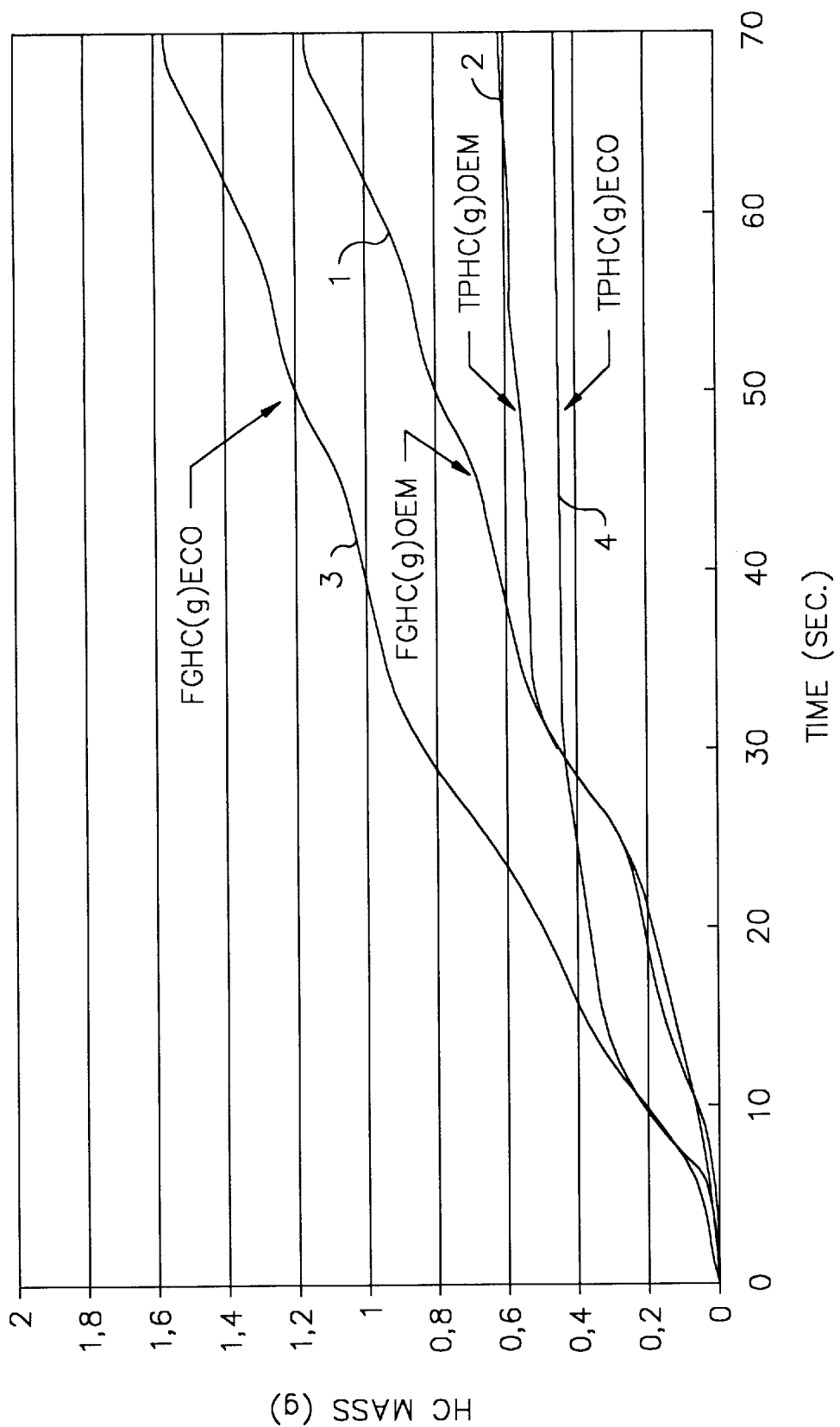
FIG. 4 is a plot of cumulative HC emissions over time in an internal combustion engine exhaust and in tailpipe gas for OEM and ECO catalyst temperature control strategies.

An alternative to minimizing the cold period engine HC exhaust emission rate is reducing the time necessary to achieve the catalytic converter light-off temperature by increasing the heat rate of the engine exhaust. FIG. 4 shows a comparison of cumulative exhaust gas (curve 1) and tailpipe gas (curve 2) HC emissions in grams versus time for a 4,000 mile aged catalyst using an original equipment manufacturer (referred herein as the OEM engine control strategy) engine control strategy which provides a lean A/F ratio ($\lambda$=1.0, ignition=5 degrees ATDC) during the cold start period compared to the cumulative exhaust gas (curve 3) and tailpipe (curve 4) HC emissions of an engine control and a new optimization strategy in accordance with the present invention (referred to herein as the ECO engine control strategy) which provides a rich A/F ratio ($\lambda$=0.9, ignition=20 degrees ATDC) that minimizes the time for the catalyst temperature to reach the catalyst light-off temperature. The reduction in cumulative tail pipe gas HC emissions can be seen by comparing FIG. 4 curves labeled TPHC (GOEM) (curve 2) and TPHC (GECO) (curve 4) which respectively plot cumulative tailpipe emission for the OEM and ECO strategies. The result of reduced cumulative tail pipe gas HC emissions shown in FIG. 4 can be directly correlated to the reduced time to achieve catalyst light-off temperature, as shown in FIG. 5, which plots catalyst temperature and HC efficiency of the catalyst versus time, for the OEM and ECO engine control strategies.

Figure 6:
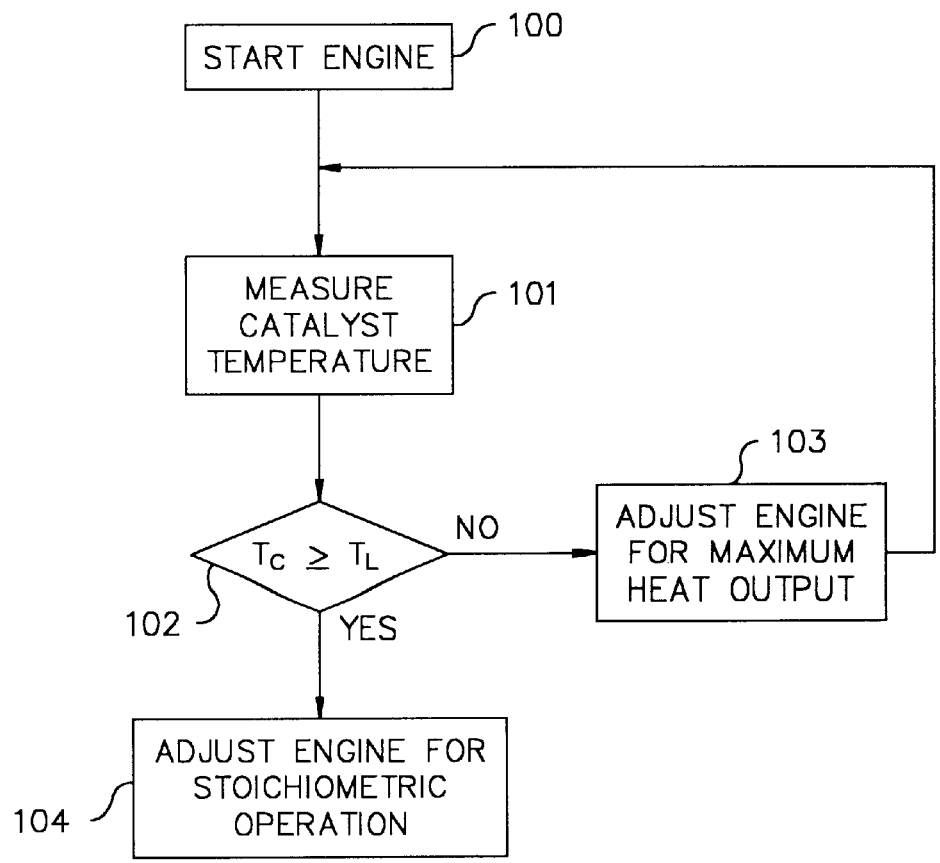
FIG. 6 is a functional flow diagram of a first preferred method for minimizing the total quantity of exhaust emissions from a catalytic converter using the first preferred embodiment of the catalyst temperature control apparatus of FIG. 2.

FIG. 6 illustrates a first preferred method of using the apparatus 10 of FIG. 2 for minimizing the total quantity of hydrocarbons emitted from a catalytic converter 16 located in the exhaust path of an internal combustion engine 12, the catalytic converter 16 including a temperature sensor 20 and having a light off temperature. Subsequent to starting the engine (step 100), the catalyst temperature is continually measured (step 101) by the temperature sensor 20 installed in the catalytic converter 16. The output 21 of the temperature sensor 20 applied to the controller 22, is enhanced by the small dimension thermocouple model 48 as discussed above and is compared with the catalytic converter light-off temperature (step 102) to determine whether the temperature of the catalyst is less than the light-off temperature. If the catalyst temperature is less than the light-off temperature, the controller 22 employs the ECO strategy to adjust at least one of the engine operating parameters, including the engine ignition timing, A/F ratio and engine bypass air so that the engine operates for maximum heating of the exhaust gas (step 103).

Figure 5:
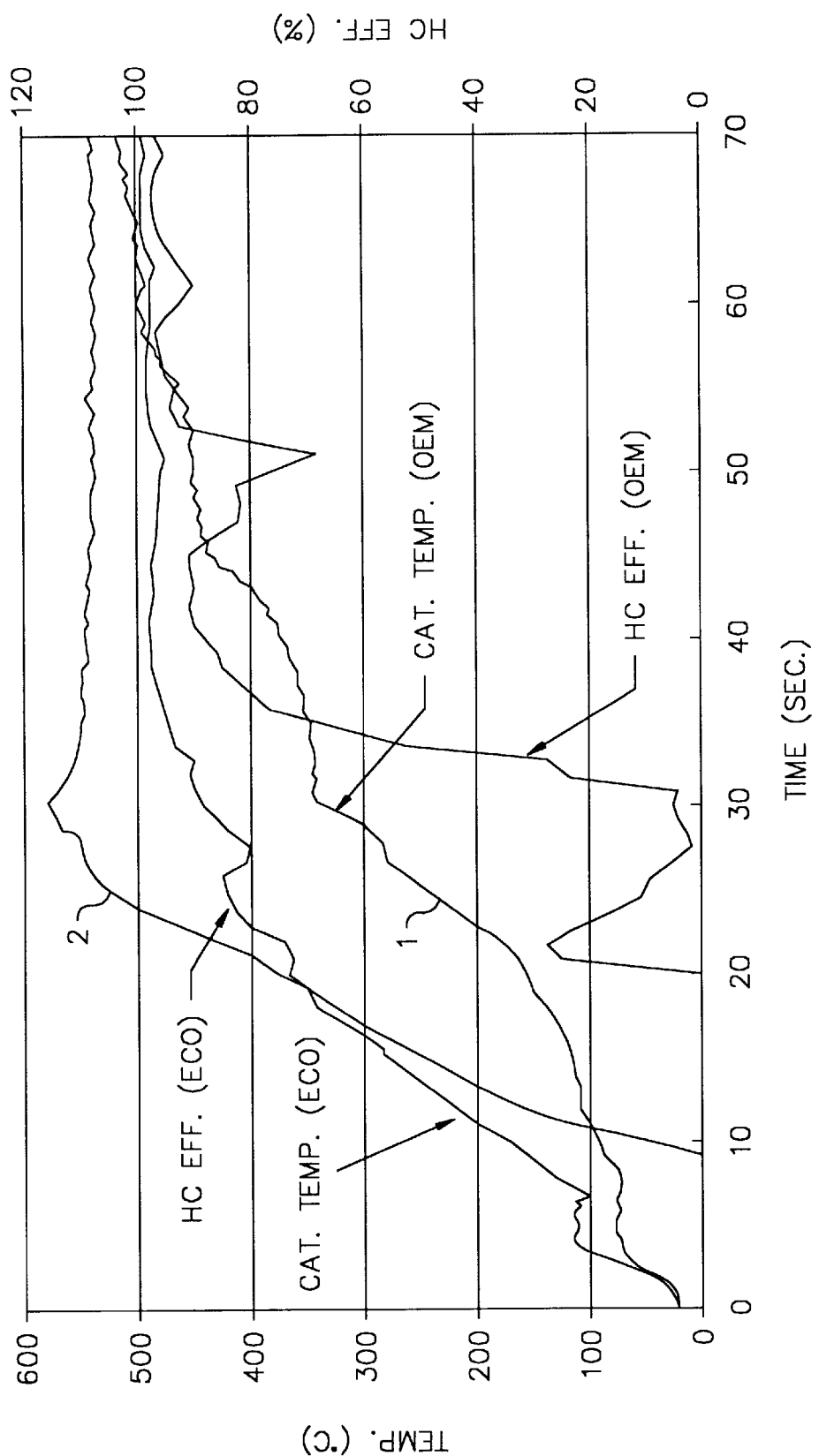
FIG. 5 is a plot of a catalyst temperature and a catalytic converter HC efficiency over time for the OEM and ECO catalyst temperature control strategies used in FIG. 4.

As illustrated in FIG. 5, under an OEM control strategy (curve 1), catalytic converter temperature rise during the cold start period is found typically to be about 10 degrees C. per second when the engine is at idle, and 20 degrees C. per second when the engine is under load. In order to achieve the desired temperature rise of 20 degrees C. per second over the entire range of engine operating conditions typically found during the cold start period, the ignition is retarded to a greater extent under the ECO strategy than under the OEM strategy.

Under the ECO control strategy, catalyst heating takes priority over reduced HC emission rate during the cold start period. Thus during the cold start period, ignition retardation is preferably set to about 20 degrees ATDC, accompanied by rich A/F ratio and high bypass airflow at idle to achieve acceptable engine operation. Under load conditions ignition retardation is reduced and idle bypass airflow is lowered, since engine load results in the desired higher exhaust temperatures without the need for the more retarded ignition. The result of operating with the ECO strategy (FIG. 5, curve 2) is heating of the catalytic converter 16 at a substantially constant high rate approaching 20 degrees C. per second during the cold start period that is nearly independent of the driving cycle from idle to moderate accelerations.

Under the ECO strategy, when the temperature of the catalytic converter 16 ($T_C$) is found to be equal to or greater than the catalyst light-off temperature ($T_L$) (step 102), the engine controls 24 are adjusted by the controller 22 to achieve stoichiometric conditions in the engine exhaust gas as shown in block 104. Accordingly, when the catalyst light-off temperature is exceeded, the A/F ratio is made leaner, the spark retardation is decreased and the idle bypass air flow is decreased so that the engine operates in a manner which is the same or similar to the manner of operation under the OEM strategy, in order to minimize the engine exhaust HC gas emission rate.

Figure 7:
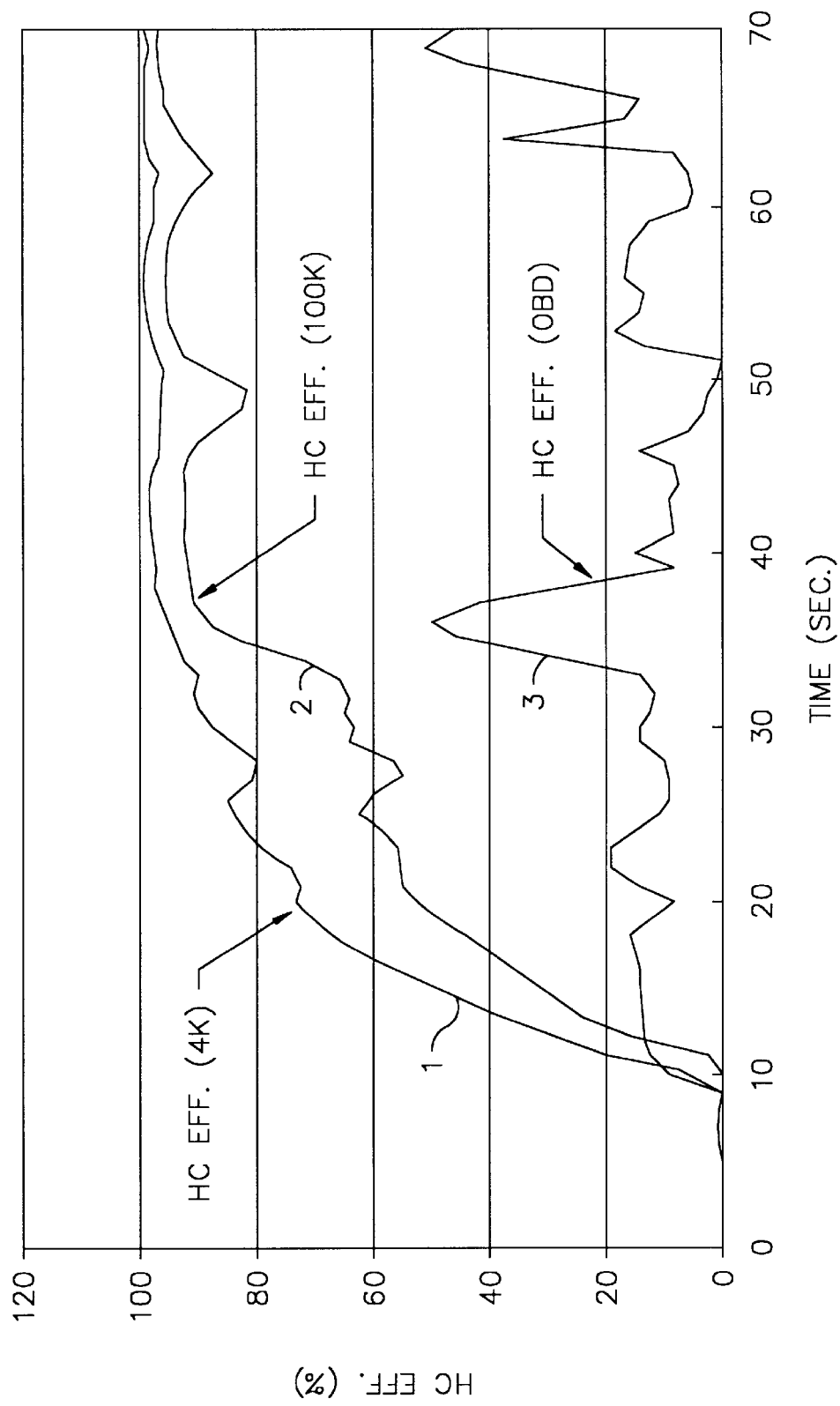
FIG. 7 is a plot of 4000 mile, 100,000 mile and OBD catalytic converter HC efficiencies measured over a light-off period.
Figure 8:
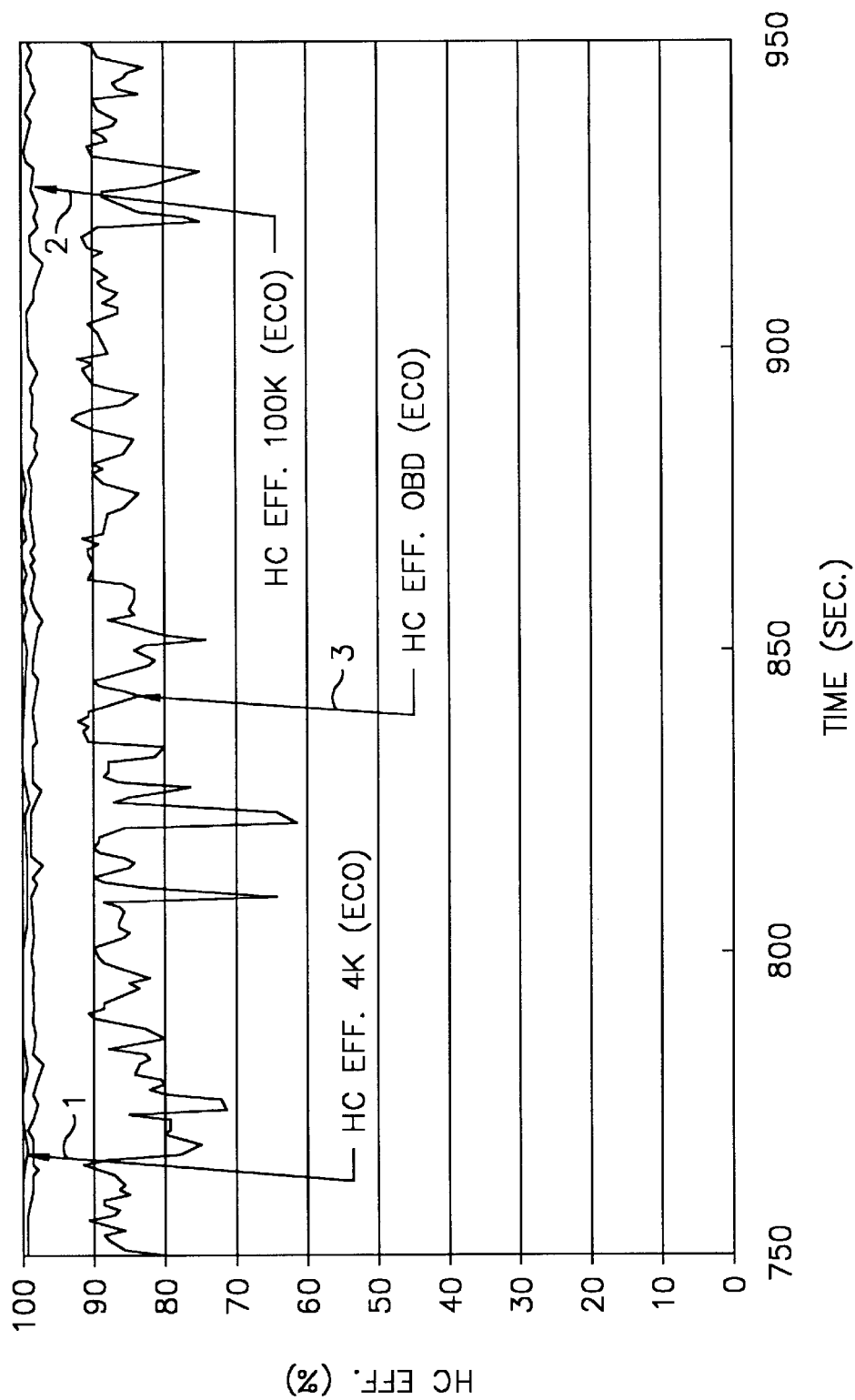
FIG. 8 is a plot of the 4000 mile, 100,000 mile and OBD catalytic converter HC efficiencies measured over a steady state period of catalytic converter operation.

It has been determined that the dominant cause of increased tailpipe gas HC emissions at low emission (LEV) or ultra-low emission vehicle (ULEV) levels is degraded catalyst light-off performance. FIGS. 7 and 8 show respectively the catalyst HC efficiency of 4000 mile aged (curve 1), 100000 mile aged (curve 2) and so-called OBD catalysts (curve 3) measured during the catalyst light-off period (FIG. 7) (i.e. the period of time proximate to catalyst light-off) and during steady state conditions (FIG. 8). (The OBD catalyst is a catalyst considered to be at the threshold of unacceptable performance). Note that the difference in HC conversion efficiency between the OBD and the 4000/100,000 mile catalysts is significant during the light-off period but much smaller during steady state operation. Thus, a method for detecting catalyst degradation based on exotherm (catalyst temperature) measurements taken during the light-off period may have greater reliability than a method of detecting catalyst degradation based on exotherm measurements taken during steady state catalyst conditions.

As noted, a primary objective of the ECO strategy to minimize undesired tailpipe HC emissions is the control of exhaust gas heating to achieve a maximum catalyst heating rate during the cold start period. The control of the exhaust gas heating rate to be substantially constant and independent of the driving cycle during the catalyst light-off period allows for measurement of the change in catalyst temperature over a predetermined time period to provide a reliable indication of catalyst degradation.

Figure 9:
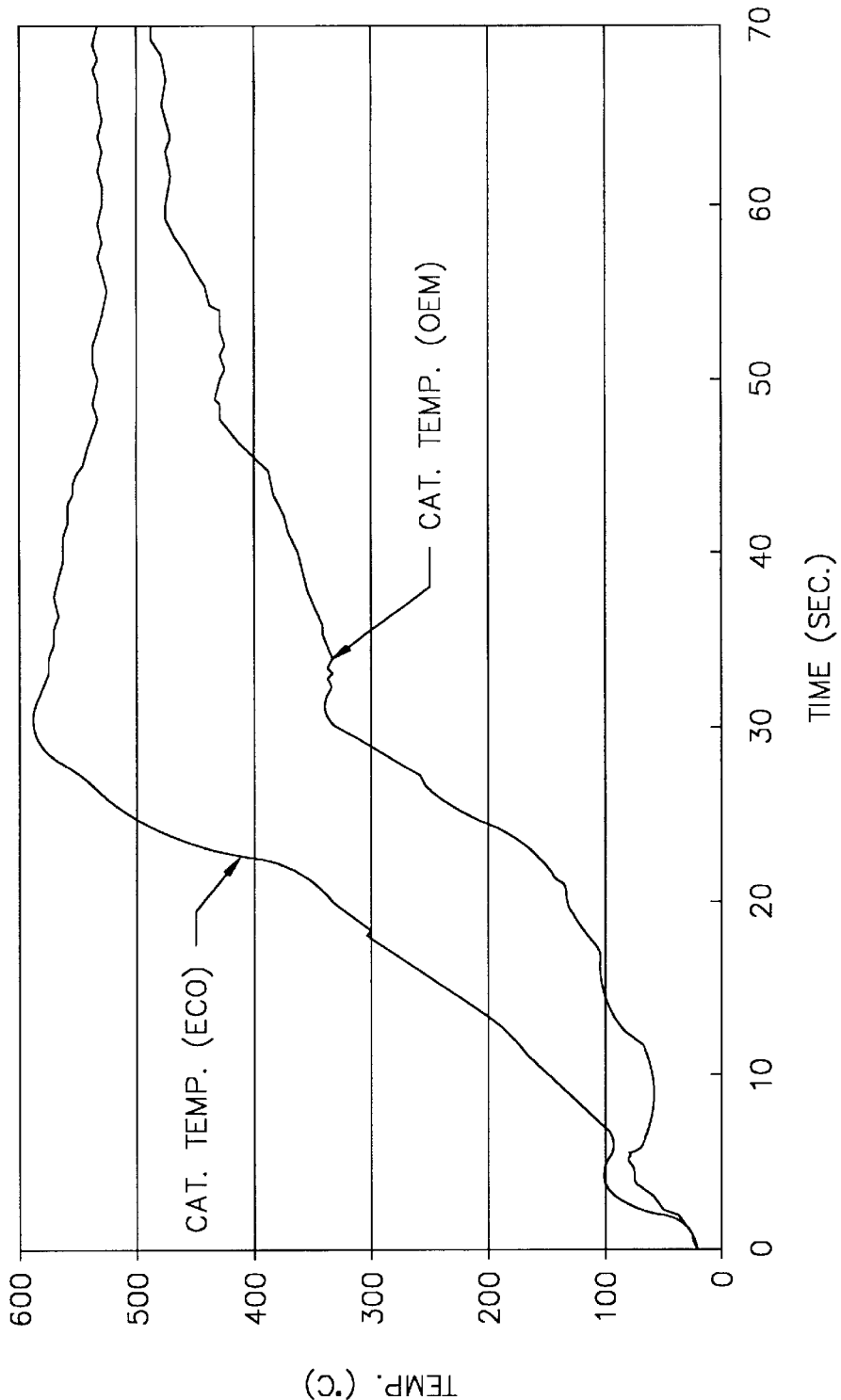
FIG. 9 is a plot of the 100,000 mile catalyst temperature when heated according to the ECO and OEM engine control strategies.

Referring now to FIG. 9 there are shown curves of catalyst temperature versus time for both the ECO and OEM engine control strategies where engine operation varies from idle (the time period from 0 to 20 sec.) to moderate acceleration (time>20 sec.). Note that the rate of catalyst temperature rise for the ECO strategy is substantially constant at about 20 degrees C. per second as described above. Note also that for at least a portion of the curve, the rate of catalyst temperature rise with the OEM strategy is also in the range of 20 degrees C. per second during vehicle acceleration even though the OEM strategy tends to utilize more advanced ignition and leaner A/F ratio than the ECO strategy. The 20 degrees per second temperature characteristic of the OEM strategy under load conditions is further indication that under load conditions, engine load predominates over engine control settings in determining the exhaust gas heat rate. One concludes from FIG. 9 that the ECO strategy is the correct strategy for normalizing the exhaust heat rate to a constant high value independent of the driving cycle during the catalyst light-off period.

Figure 10:
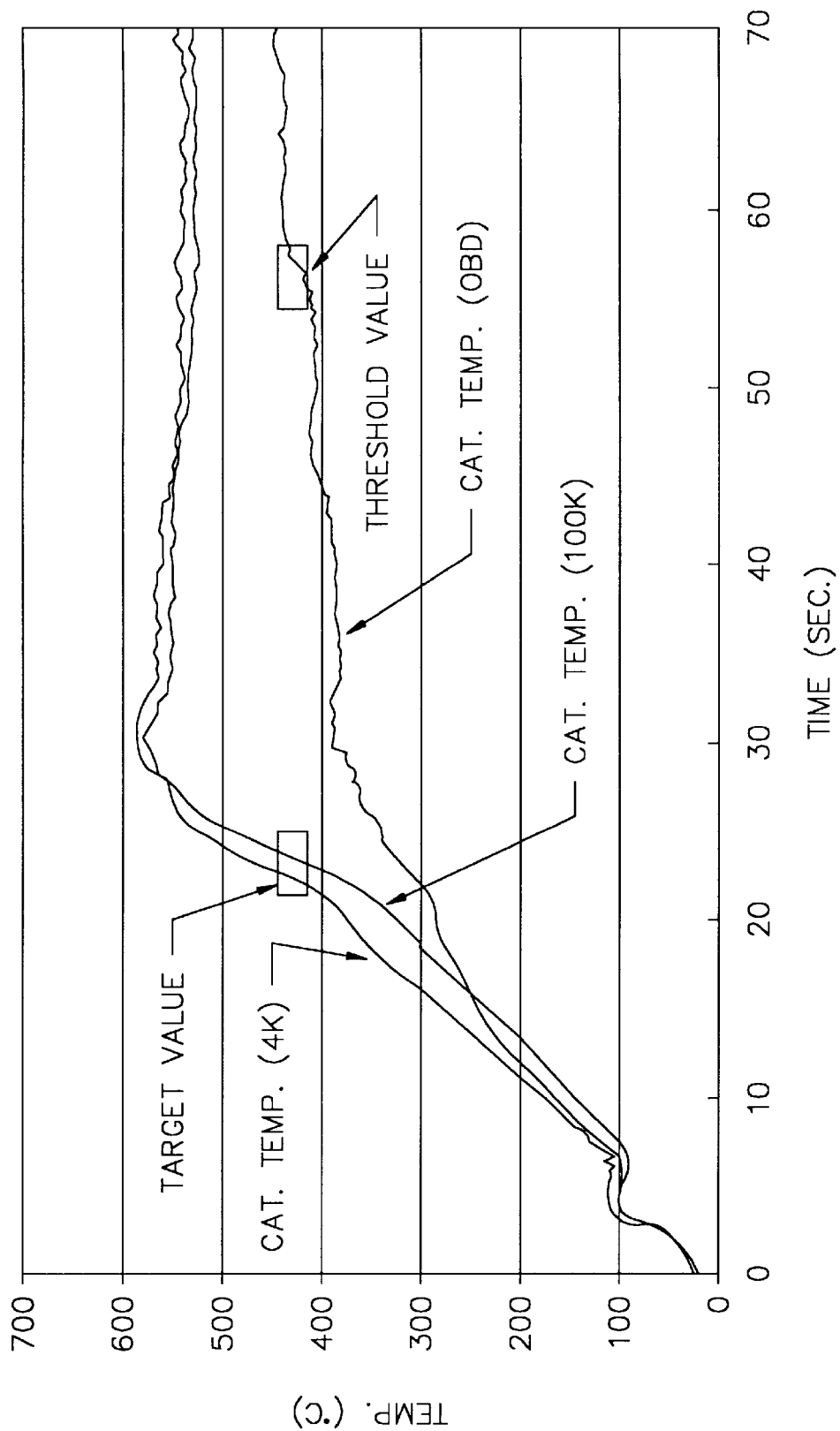
FIG. 10 is a plot of 4000 mile, 100,000 mile and OBD catalysts when heated according to the ECO engine control strategy.

FIG. 10 illustrates the application of the ECO strategy during the catalyst light-off period to catalyst diagnostics. In FIG. 10 the temperature of 4000 mile, 100,000 mile and OBD catalysts during a light-off period from an engine cold start are plotted as a function of time. Note that the degraded OBD catalyst can be differentiated from the 4000 mile and 100,000 mile (satisfactorily functioning) catalysts by two characteristics of the catalyst temperature responses. First, the temperatures of the 4000 mile and 100,000 mile catalysts increase at higher rates at catalyst temperatures above the catalyst light-off temperature compared to the rate of catalyst temperature rise below the catalyst light-off temperature. This effect is due to the catalyst exothermal reaction occurring above the light-off temperature in the satisfactorily operating catalysts. Second, the time needed to achieve a predetermined catalyst target temperature (i.e. about 450° C. for the measured catalyst) is much greater for the degraded OBD catalyst than for a satisfactorily functioning catalyst.

The catalyst temperature control apparatus 10 of FIG. 2 may be configured in a second preferred embodiment for diagnosing degradation of HC efficiency of a catalytic converter 16 by measuring the catalyst temperature over a light-off period. As described above, the catalyst temperature control apparatus 10 includes a temperature sensor 20 coupled to the catalytic converter 16 for continuously generating a temperature output signal 21 representative of the catalyst temperature and a controller 22 to cause controlled heating of the catalyst over the light-off period and for receiving the output signal 21 from the temperature sensor 20 and generating an indicator signal indicative of the catalytic converter HC efficiency based on a change in the catalyst temperature during a light-off period. The second preferred embodiment of the catalyst temperature control apparatus 10 includes the same components as the first preferred embodiment and differs from the first preferred embodiment only by different computer program steps performed in the controller 22.

In the second preferred embodiment of the catalyst temperature control apparatus 10, the controller 22 causes the catalyst to be heated at a substantially constant rate during the light-off period. The computer program in the controller 22 executes the ECO strategy as discussed above to control the ignition timing and idle bypass airflow at a programmed open loop A/F ratio during the catalyst light-off period to produce the substantially constant catalyst heating rate over a range of engine 12 operating conditions from idle to moderate acceleration during the cold start period.

Referring now to FIG. 10 one observes that for satisfactorily functioning 4000/100,000 mile catalysts, the rate of change of catalyst temperature at catalyst temperatures higher than the catalyst light-off temperature is greater than the rate of change of catalyst light-off temperature at catalyst temperatures lower than the catalyst light-off temperature. This is the result of the exothermal reaction occurring in a properly functioning catalyst. Further, one observes in FIG. 10 that the rate of change of temperature of the OBD catalyst substantially declines above the catalyst light-off temperature. Accordingly, in determining whether catalytic converter HC efficiency has degraded, the second preferred embodiment of the controller 22 generates an indicator signal 38 indicating a degraded state of the catalytic converter 16 when the rate of change of the catalyst temperature measured over a predetermined first time period starting from when the catalyst reaches the catalyst light-off temperature is less than a value based on the rate of change of the catalyst temperature measured during a second time period occurring during the cold start period. In the second preferred embodiment of the catalyst temperature control apparatus 10 the controller 22 provides the indicator signal 38 to the MIL indicator 28 to inform the vehicle user of catalytic converter 16 degradation or malfunction.

Referring again to FIG. 10 one may also observe that, when operating under the ECO engine control strategy, the OBD catalyst temperature increases toward the steady state catalyst temperature (see FIG. 11) at a significantly lower rate than does the catalyst temperature of the 4000/100,000 mile catalysts. Accordingly, the second preferred embodiment of the catalyst temperature control apparatus may generate the indicator output signal 38 based upon the time required for the catalyst temperature to exceed a predetermined target temperature (shown as about 450° C. by the rectangular areas in FIG. 10) being greater than a predetermined value. In this case, the target temperature is selected intermediate between the light-off temperature of a normally functioning catalyst and the steady state catalyst temperature and would be specific to each catalytic converter type.

Figure 11:
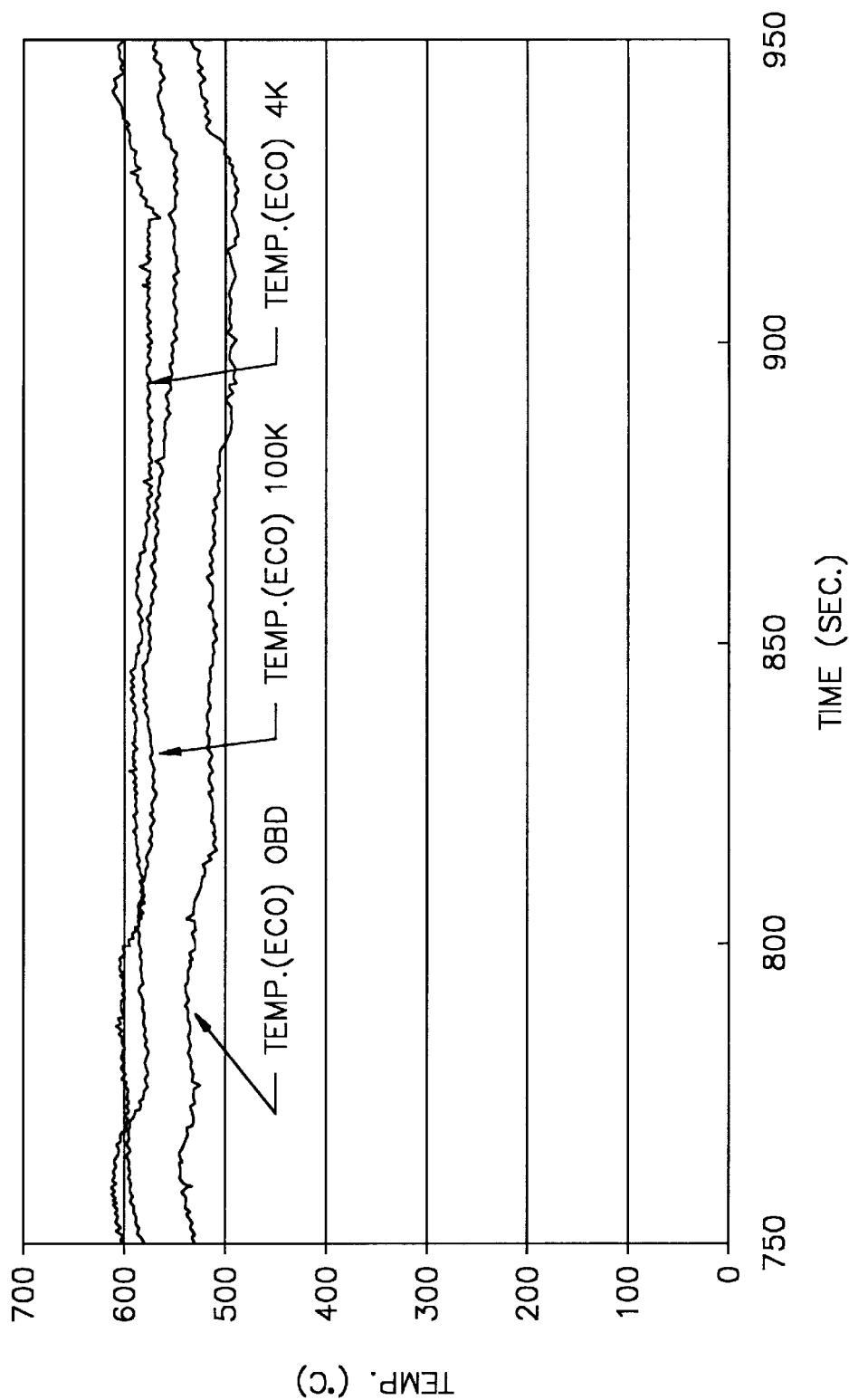
FIG. 11 is a plot of 4000 mile, 100,000 mile and OBD catalysts at under steady state conditions.

Referring now to FIG. 11, there is shown a plot of 4000 mile, 100,000 mile and OBD catalysts during the steady state portion of FTP75. FIG. 11 shows the average temperature difference between the OBD and the 4000/100,000 mile catalysts is about 50 degrees C. Under state conditions the measured temperature difference between the OBD and the 4,000/100,000 mile catalysts provides a high sensitivity signal for monitoring the steady state HC efficiency of the catalyst. A technique for diagnosing the degradation of catalyst HC conversion efficiency based on this result is to utilize an empirically derived map of catalyst temperatures at various stabilized driving conditions and set a threshold of minimum temperature difference for each driving condition. One may also compare the actual measured catalyst temperature to a calculated predetermined engine exhaust temperature based on a steady state exhaust gas temperature model of the catalytic converter. The difference in steady state catalyst temperature between the degraded and un-degraded catalytic converters provides a steady state catalyst performance measurement to further increase the robustness of the HC efficiency diagnostic function.

Figure 12:
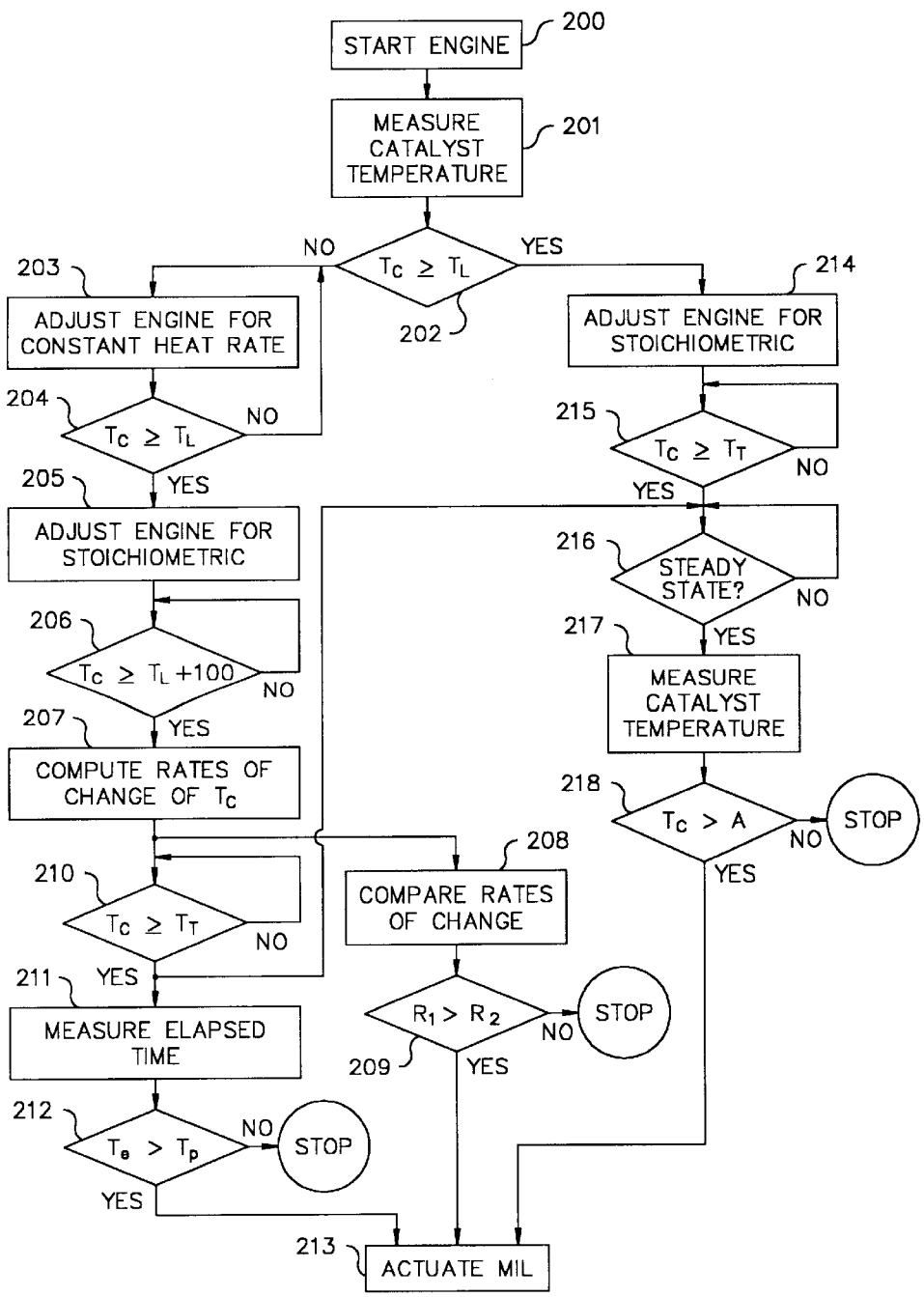
FIG. 12 is a functional flow diagram of first, second and third preferred methods for simultaneously diagnosing the HC conversion efficiency of a catalytic converter and minimizing the total HC emission from the catalytic converter in accordance with a second preferred embodiment of the catalyst temperature control apparatus of FIG. 2.

Referring now to FIG. 12, there is shown a first preferred method of diagnosing degradation of HC efficiency of a catalytic converter 16, including a catalyst, connected to the exhaust of an internal combustion engine 12 based on measuring the temperature of the catalyst during a light-off period, the catalytic converter 16 including a temperature sensor 20 and the catalyst having a light-off temperature. Subsequent to starting the engine 12 (step 200), the catalyst temperature ($T_C$) is continually measured (step 201) by the temperature sensor 20. The temperature sensor output 21 is applied to the controller 22, where each catalyst temperature measurement is stored in the controller 22 memory and compared with a predicted catalyst light-off temperature ($T_L$) (step 202) to determine whether the temperature of the catalyst is less than the predicted light-off temperature. If the catalyst temperature is less than the predicted light-off temperature (i.e. indicative of the cold start period), the engine controls 24 are adjusted to modify the engine operating parameters to cause controlled heating of the catalyst (step 203). More specifically, the engine 12 ignition timing, A/F ratio and bypass air are adjusted as discussed above to execute the ECO strategy and to thereby achieve a substantially constant rate of rise of catalyst temperature over the range of engine operating conditions from idle through moderate acceleration. Typically, the ignition timing is adjusted to about 20 degrees ATDC when the engine is idling during the cold start period to achieve the desired substantially constant heat rate. When the catalyst temperature is equal to or exceeds the predicted catalyst light-off temperature (step 204) the engine controls 26 are adjusted for stoichiometric conditions (step 205) in accordance with the OEM strategy. Under normal conditions the catalyst temperature continues to increase toward the steady state temperature (FIG. 11). When the catalyst temperature reaches the predicted light-off temperature plus a predetermined temperature of about 100 degrees C. (step 206), the rates of change (R1, R2) of the catalyst temperature for the period of time when the catalyst temperature is less than the predicted light-off temperature and the period of time when the catalyst temperature is greater than or equal to the predicted catalyst temperature are determined by the controller 22 from the temperature measurements taken during the light-off period and stored (Step 207). The rates of change of temperature are compared (step 208) and if the rate of change during the time period for which the catalyst temperature is greater than or equal to the predicted light-off temperature is not greater than the rate of temperature change for the period of time when the catalyst temperature is less than the predicted light-off temperature (step 209) the controller 22 outputs an indicator signal 38 to the MIL to provide a visual indication of the catalytic converter degradation or failure to a user (step 213).

Typically, the catalyst temperature continues to increase past a predetermined target temperature ($T_T$) unique to each specific type of catalytic converter. In a second preferred method, using the second preferred apparatus 10 shown in FIG. 2, the elapsed time ($t_e$) from when the engine 12 is started to when the catalyst temperature exceeds the target temperature (step 210) is computed by the controller 22 (step 211). The elapsed time is then compared to a predetermined value ($t_p$) stored in the controller 22 (step 212). If the time exceeds the predetermined value, the controller 22 outputs an indicator signal 38 to the MIL to provide a visual indication to a user of the catalytic converter degradation or failure (step 213).

Alternatively, or in addition to the second preferred method, the catalyst temperature is numerically integrated over time from where the catalyst temperature reaches about 125 degrees C., (i.e. a catalyst temperature slightly greater than the condensation temperature), for about a fifteen second period thereafter. If the numerical integration of the catalyst temperature is less than a predetermined value the controller 22 outputs an indicator signal 38 to the MIL to provide a visual indication to a user of the catalytic converter degradation or failure (step 213).

If the engine 12 continues to operate, the catalyst temperature will likely continue to rise until it reaches the steady state temperature characteristic of the specific type of catalytic converter and the specific engine operating conditions (step 216). In a third preferred method, the catalyst steady state temperature is measured (step 217) by the controller 22 and is compared to a predetermined threshold (step 218). If the steady state catalyst temperature is less than the predetermined threshold (A) for the specific driving conditions, the controller 24 outputs an indicator signal 38 to the MIL 28 to provide a visual indication to a user of the catalytic converter degradation or failure (step 213).

If the catalyst temperature is greater than the light-off temperature at step 202, it is an indication that the engine catalyst is still hot from previous operation. In this case, the engine 12 is adjusted for stoichiometric conditions in the engine exhaust (step 214). The catalyst temperature is then continually measured to determine if it exceeds the target temperature (step 215). If the catalyst temperature exceeds the target temperature, the third preferred method for diagnosing the catalyst degradation is enabled as described above.

It will be apparent to one skilled in the art that the diagnosis of degraded HC efficiency may be accomplished by measurements based on assessment of the rate of change of catalyst temperature, or the time for the catalyst to achieve a predetermined temperature or the catalyst temperature under steady state conditions. In addition, these aforementioned measurement assessments may be combined, as commonly known to those skilled in the art, to provide a more robust indication of degraded catalyst HC efficiency.

The present invention provides a method and apparatus for diagnosing the HC efficiency of a catalytic converter in the exhaust path of an internal combustion engine and simultaneously minimizing total HC emissions from the catalytic converter using only a single temperature sensor located in the catalytic converter. The method, named ECO strategy, relies on adjusting the engine operating parameters during the cold start period to first provide sufficient heat output to cause the catalyst temperature to rise at a rate approaching 20 degrees per second and second to cause the rate of catalyst temperature rise to be substantially constant over a range of engine operating conditions ranging from engine idle to moderate acceleration. Experimental evidence has validated the effectiveness of catalyst temperature measurements during the light-off period for HC efficiency diagnosis and reduction of HC emission.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. An apparatus for minimizing the total quantity of hydrocarbon emissions from a catalytic converter in the exhaust path of an internal combustion engine, the catalytic converter including a catalyst having a light-off temperature, the apparatus comprising:
   a temperature sensor coupled to the catalytic converter for continuously generating an output signal representative of the catalyst temperature; and
   a controller for receiving the output signal from the temperature sensor, for enhancing the output signal to have a response time of less than one second, and for adjusting at least one operating parameter of the engine to cause the catalyst temperature to rapidly rise when a catalyst temperature is less than the light-off temperature and adjusting at least one operating parameter of the engine to minimize the rate of hydrocarbon emissions output from the catalytic converter when the catalyst temperature is greater than the light-off temperature.

2. An apparatus according to claim 1 wherein the controller adjusts ignition timing of the engine to be substantially retarded when the catalyst temperature is less than the light-off temperature thereby causing the catalyst temperature to rapidly rise.

3. An apparatus according to claim 2 wherein the controller adjusts the ignition timing to about 20 degrees ATDC when the engine is idling.

4. An apparatus according to claim 1 wherein the catalyst temperature rises at a rate of about 20 degrees Celsius per second in response to at least one operating parameter when the catalyst temperature is less than the catalyst light-off temperature.

5. A method of minimizing the total quantity of hydrocarbons emitted from a catalytic converter located in the exhaust path of an internal combustion engine, the catalytic converter including a temperature sensor and a catalyst having a light-off temperature, the method comprising the steps of:
   continuously determining the catalyst temperature based on an output signal from the temperature sensor;
   adjusting at least one operating parameter of the engine to cause the catalyst temperature to rapidly rise when the catalyst temperature is less than the light-off temperature; and
   adjusting at least one operating parameter of the engine to achieve substantially stoichiometric conditions in the exhaust of the engine when the catalyst temperature is equal to or greater than the catalyst light-off temperature.

6. The method according to claim 5 wherein ignition timing of the engine is adjusted to be substantially retarded when the catalyst temperature is less than the catalyst light-off temperature thereby causing the catalyst temperature to rapidly rise.

7. The method according to claim 6 wherein the ignition timing is adjusted to be about 20 degrees ATDC when the engine is idling.

8. The method according to claim 5 wherein the catalyst temperature rises at a rate of about 20 degrees Celsius per second in response to at least one operating parameter when the catalyst temperature is less than the catalyst light-off temperature.

9. An apparatus for diagnosing degradation of hydrocarbon conversion efficiency of a catalytic converter including a catalyst by measuring the catalyst temperature during a light-off period comprising:
   a temperature sensor coupled to the catalytic converter for continuously generating a first output signal representative of the catalyst temperature; and
   a controller for receiving the first output signal from the temperature sensor for enhancing the output signal to have a response time of less than 1 second and for controlled heating of the catalyst during a cold start period whereby the controller generates a second output signal indicative of the catalytic converter hydrocarbon efficiency based on a change in the catalyst temperature during the light-off period.

10. An apparatus according to claim 9 wherein the controller controls the heating of the catalyst to be at a substantially constant rate during the cold start period.

11. An apparatus according to claim 10 wherein the controller adjusts at least one of the engine ignition timing, air/fuel ratio, secondary air and bypass air to maintain the substantially constant rate of catalyst heating during the cold start period.

12. An apparatus according to claim 9 wherein the catalyst has a light-off temperature and where the controller generates the second output signal when a ratio formed of a first rate of change of the catalyst temperature based on the catalyst temperature measured at temperatures greater than the light-off temperature, and a second rate of change of catalyst temperature measured during the cold start period is less than or equal to a predetermined value.

13. An apparatus according to claim 9 wherein the controller generates the second output signal when the time required for the catalyst temperature to exceed a predetermined temperature is greater than a predetermined value.

14. An apparatus according to claim 9 wherein the catalyst temperature is numerically integrated over a period of time from where the catalyst temperature is equal to about 125 degrees C. and for about 15 seconds thereafter and where the controller generates the second output signal when the numerically integrated catalyst temperature value is less than a predetermined value.

15. An apparatus according to claim 9 further comprising an indicator for receiving the second output signal and for providing a visual indication to a user.

16. A method of diagnosing degradation of hydrocarbon conversion efficiency of a catalytic converter including a catalyst, located in the exhaust path of an internal combustion engine, based on measuring the temperature of the catalyst during a light-off period, the catalytic converter including a temperature sensor and the catalyst having a light-off temperature, the method comprising the steps of:

adjusting an operating parameter of the engine to cause a controlled heating of the catalyst during the cold start period;

continuously determining the temperature of the catalyst based on an output signal from the temperature sensor;

computing a rate of change of the catalyst temperature;

comparing the rate of change of the catalyst temperature during a first period of time when the catalyst temperature is less than the light-off temperature to the rate of change of the catalyst temperature during a second period of time when the catalyst temperature is greater than or equal to the light-off temperature; and generating an output signal indicative of the catalytic converter having a degraded hydrocarbon conversion efficiency if the rate of change of the catalyst temperature during the second period of time is less than or equal to the rate of change of catalyst temperature during the first period of time by at least a predetermined value.

17. The method of claim 16 wherein the catalyst is heated at a substantially constant rate.

18. The method of claim 17 wherein at least one of the engine ignition timing, air/fuel ratio and bypass air are adjusted to maintain the substantially constant rate of heating over a range of the engine operating conditions during the cold start period.

19. The method of claim 18 wherein the ignition timing is adjusted to about 20 degrees ATDC when the engine is idling.

20. A method of diagnosing degradation of hydrocarbon conversion efficiency of a catalytic converter located in the exhaust path of an internal combustion engine by measuring the temperature of a catalyst in the catalytic converter during a light-off period, the catalyst having a light-off temperature, the method comprising the steps of:

continuously determining the temperature of the catalytic converter based on an output signal from a temperature sensor coupled to the catalytic converter;

adjusting an operating parameter of the engine to cause a controlled heating of the catalyst during a cold start period;

measuring the time period required for the catalyst temperature to exceed a predetermined target temperature; and generating an output signal indicative of the catalytic converter having a degraded hydrocarbon conversion efficiency if the time period required for the catalyst temperature to exceed the predetermined target temperature is greater than a predetermined value.

21. The method of claim 20 wherein the catalyst is heated at a substantially constant rate.

22. The method of claim 21 wherein at least one of the engine ignition timing, air/fuel ratio and bypass air are adjusted to maintain the substantially constant rate of heating of the catalyst over a range of the engine operating conditions during the cold start period.

23. The method of claim 22 wherein the ignition timing is adjusted to about 20 degrees ATDC when the engine is idling.

24. A method of simultaneously diagnosing degradation of hydrocarbon conversion efficiency of a catalytic converter in the exhaust path of an internal combustion engine and minimizing total hydrocarbon emissions from the catalytic converter, the catalytic converter including a catalyst having a light-off temperature, the method comprising the steps of:

continuously determining the temperature of the catalyst based on a first output signal from a temperature sensor coupled to the catalytic converter;

adjusting at least one operating parameter of the engine to cause substantially constant heating of the catalyst when the catalyst temperature is less than the light-off temperature whereby the catalyst temperature rapidly rises;

adjusting at least one operating parameter of the engine to achieve substantially stoichiometric conditions in the exhaust of the engine when the catalyst temperature is equal to or greater than the catalyst light-off temperature;

measuring the time required for the instantaneous temperature of the catalyst to exceed a predetermined target temperature; and generating a second output signal indicative of degraded hydrocarbon conversion efficiency if the time period required for the catalyst temperature to exceed the predetermined target temperature is greater than a predetermined value.

25. The method of claim 24 wherein at least one of the engine ignition timing, air/fuel ratio and bypass air is adjusted to maintain the substantially constant rate of heating over a range of the engine operating conditions during the cold start period.

26. The method of claim 25 wherein the ignition timing is adjusted to about 20 degrees ATDC during the cold start period when the engine is idling.

* * * * *

UNITED STATES PATENT AND TRADEMARK OFFICE
CERTIFICATE OF CORRECTION

PATENT NO. : 6,202,406 B1
DATED : March 20, 2001
INVENTOR(S) : Joseph R. Griffin and Hamid B. Servati It is certified that error appears in the above-identified patent and that said Letters Patent is hereby corrected as shown below:

Title page,
Item [73], Assignee information should read as follows: -- Heraeus Electro-Nite International N.V., Houthalen (BE) --.

Signed and Sealed this

Twentieth Day of November, 2001

Attest:

*Attesting Officer*

NICHOLAS P. GODICI
*Acting Director of the United States Patent and Trademark Office*